Oct. 5, 1965  G. E. BRIGGS ETAL  3,210,732
SWITCHING NETWORK

Filed Jan. 31, 1958  4 Sheets-Sheet 3

INVENTORS
GEORGE E. BRIGGS
BERNARD A. DILORENZO
BY
*F. L. Sullivan*
ATTORNEY

Oct. 5, 1965   G. E. BRIGGS ETAL   3,210,732
SWITCHING NETWORK
Filed Jan. 31, 1958   4 Sheets-Sheet 4

INVENTORS
GEORGE E. BRIGGS
BERNARD A. DILORENZO
BY
ATTORNEY

United States Patent Office 3,210,732
Patented Oct. 5, 1965

3,210,732
SWITCHING NETWORK
George E. Briggs, Danvers, and Bernard A. Di Lorenzo, Waltham, Mass., assignors, by mesne assignments, to Sylvania Electric Products Inc., Wilmington, Del., a corporation of Delaware
Filed Jan. 31, 1958, Ser. No. 712,345
13 Claims. (Cl. 340—172.5)

This invention is concerned with electronic data processing systems, and in particular with switching networks useful in such systems.

In data processing it is sometimes necessary to allocate information among different communication channels in accordance with a changing priority. For example, in satellite tracking it may be desirable to track the orbit of the observed satellite with a radar from one position; then, transmit the information obtained to a computer to predict its orbit for another position; and, successively average at a central location predicted and observed orbits from different positions, with the latest observation and prediction being given the greatest weight in computing future orbits, the second latest prediction and observation the next greatest weight, etc. Similar shifting of priority for credence checking purposes may be employed in radar systems. Also, in communications networks having a plurality of inputs and a plurality of outputs under simultaneous connection, it is frequently desirable to interchange the connections between the various inputs and outputs in accordance with changing circumstances.

Such data processing problems call for a reliable switching system capable of connecting any one of a number of inputs to any one of a number of outputs and interchanging these connections as desired. The speed and reliability with which the switching network can accomplish these changes is a determining factor in the overall efficiency of the system.

The required switching can be performed with complicated combinations of electromagnetic relays, but only with definite limitations of speed and reliability. Also, networks of vacuum tubes or transistors and gating circuits can be used but they are complex and expensive.

Accordingly, a principal objective of the present invention is to provide for a data processing system, an improved switching network, and especially one which will have a faster response, be less complex in design and structure, and more reliable in operation than those hitherto available.

This is accomplished, in a preferred embodiment of the invention, with a multi-channel data processing system having a switching network comprising a plurality of transfluxors arranged in a matrix of $x$ and $y$-coordinate rows and having input and output windings so interconnected as to make it possible, by appropriate "set" pulse control to interchange the connection between input and output channels as desired.

Other objectives and embodiments of the invention will be apparent to those skilled in the art from the following description and reference to the accompanying drawings, in which.

Figure 1:
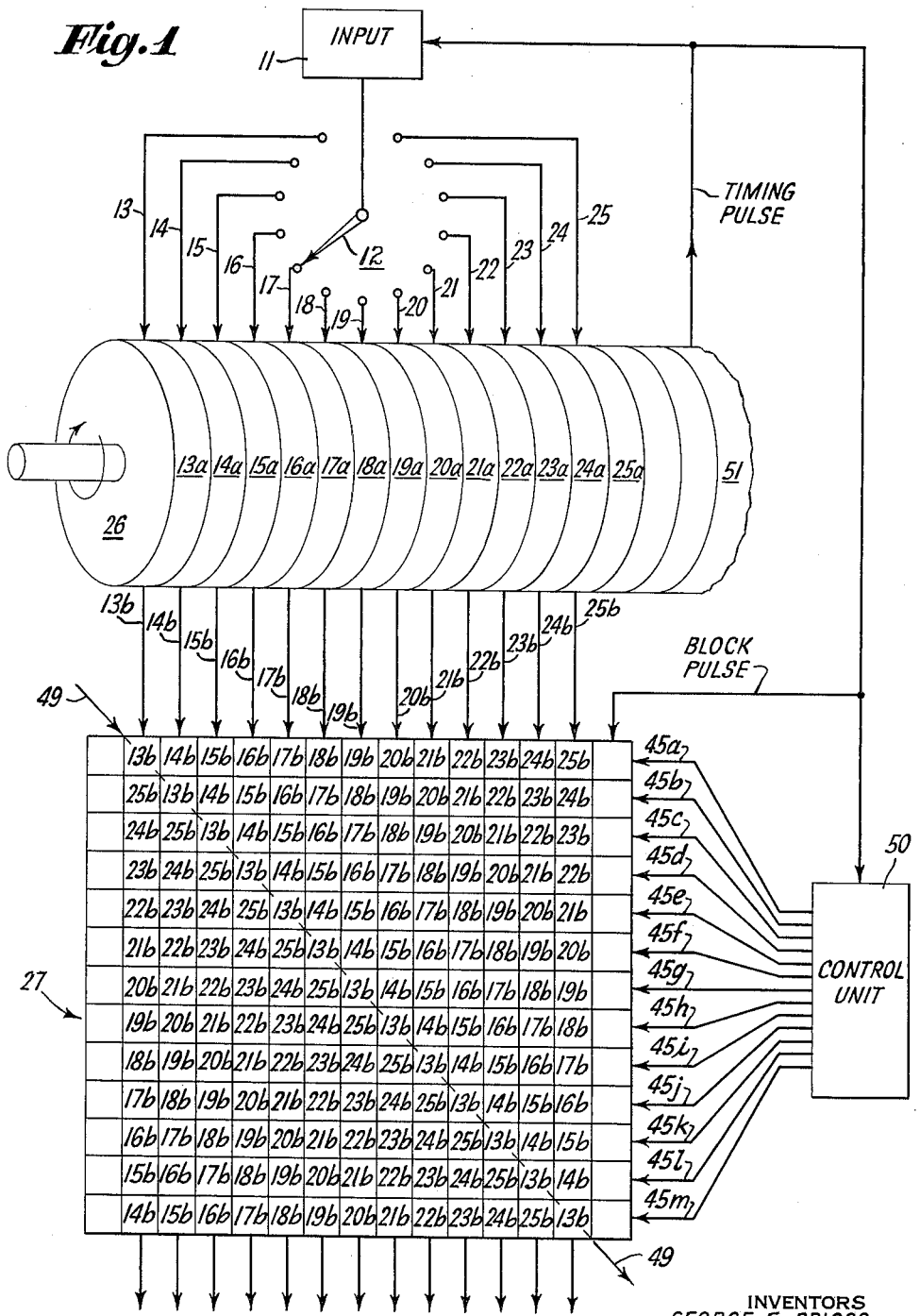
FIG. 1 is a diagrammatic representation of a data processing system according to one embodiment of the invention.

The data processing system shown diagrammatically, by way of example, in FIG. 1 comprises: an input 11, which is a source of information to be processed; a switch 12 connecting this source of information to various communication channels 13–25 in a desired sequence; a magnetic storage drum 26, having a plurality of storage tracks 13a–25a; a switching matrix 27 having a plurality of inputs 13b–25b and a plurality of outputs A–M; and, a control unit 50.

The input 11 may process: data obtained by successive scans of a radar system; the results of various electronic computations; or, other information in signal form. In the present embodiment of the invention, digital signals are contemplated, but other forms of electronic intelligence may be handled.

The magnetic memory drum 26 is rotated by an overall control system (not shown); and, a clocking pulse on a track 51 of the drum 26 gates the input 11 and controls the operation of switch 12 to connect the input 11 to an appropriate channel 13–25 for storing current information on a desired track 13a–25a of drum 26.

The same timing pulse source which gates the input 11 and controls the switch 12 also initiates (in an amplifier, not shown) a "block" signal to the switching matrix 27, and gates the control unit 50 to effect the desired interconnection between inputs 13b–25b and outputs A–M in a manner described in more detail below, with the necessary switching being accomplished by transfluxors 28 (FIGS. 2–9) arranged in vertical ($x$) and horizontal ($y$) coordinate rows to form the switching matrix 27.

Information coming from the input 11 is transmitted through the various channels 13–25 and is stored on tracks 13a–25a of the drum 26, whence it is fed into the switching matrix 27 via inputs 13b–25b. In the present embodiment, the transfluxors 28 are so interconnected and the control unit 50 so operated that during a first rotation of the drum 26, information stored on the memory track 13 is fed via input 13b to the matrix 27 and connected to output A. On a second rotation of drum 26, input 13b is connected to output B. Similarly on a third and successive rotations of drum 26, input 13b is connected to outputs C to M, moving one output channel to the right for each rotation of the drum. Simultaneously, the other channels 13b–25b are connected respectively to outputs B–M for the first rotation of drum 26 and each input has its connection shifted to the next adjacent output to the right upon successive rotations. Input 25b is connected to output M on the first rotation, and output A on the second; and the other inputs follow suit, so that after each input has been connected to output M, it is connected on the next rotation to output A, and then on successive rotations works its way to the right to connect again with lowest priority output M.

Functioning of the switching matrix 27 depends upon selective operation of its individual transfluxors 28 (FIGS. 2–9) each of which comprises a small ferro-magnetic core 29 having a large aperture 30 and a small aperture 31. These transfluxor cores have a square hysteresis characteristic, with remanent flux substantially equal to saturation flux, their structure and operation being described in an article by J. A. Rajchman in the March 1956 issue of the Proceedings of the IRE, p. 321.

Figure 2:
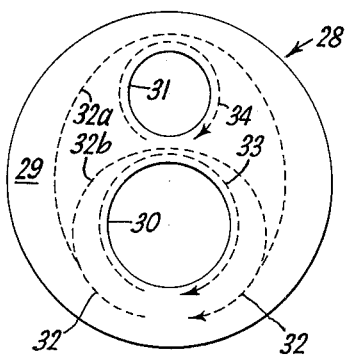
FIG. 2 is a diagrammatic representation of a transfluxor showing its paths of magnetic flux.

Referring to FIG. 2, the transfluxor 28 has three main paths of magnetic flux. The principal path 32 flows circularly through the core 29, branching into subpath 32a, above the aperture 31, and subpath 32b, between the apertures 30 and 31. Path 33 follows the outline of aperture 30 and path 34 similarly circumscribes aperture 31. The direction of the flux in these paths is determined by the polarity of the particular current pulse setting the flux.

Figure 3:
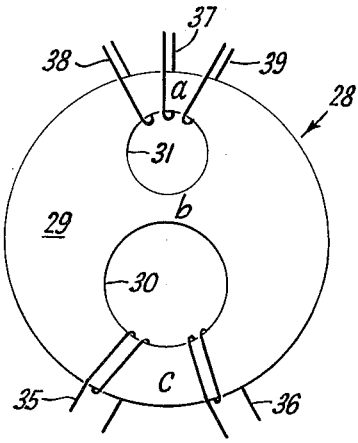
FIG. 3 is a diagrammatic representation of a transfluxor with "block," "set," input, output, and prime windings.
Figure 4:
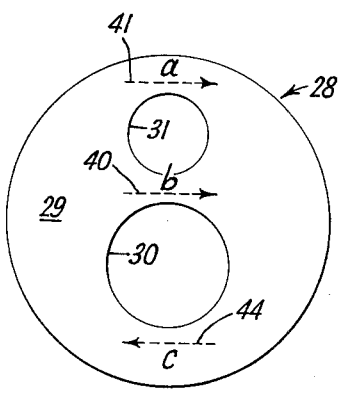
FIG. 4 is a diagrammatic representation of a transfluxor in the "blocked" state.

The flux paths 32, 33, and 34 create magnetic legs a, b, and c in the core 29 above aperture 31, between apertures 30 and 31, and below aperture 30 respectively. In FIG. 3, a "block" winding 35 and a "set" winding 36 are shown linking the core 29 through aperture 30, and an input winding 37, an output winding 38, and a prime winding 39 linking aperture 31. If a sufficiently strong current pulse is fed through the "block" winding 35 to saturate the core 29, legs a, b, and c are set in a remanent flux state in the direction indicated by arrows 40, 41 and 44 in FIG. 4. With the core in this condition, there is no coupling between the input winding 37 and the output winding 38 linked through aperture 31 (whether it be pulsed by positive or negative signals), for the following reason. A clockwise flux-producing pulse would seek to set the flux in leg a in the direction of arrow 41 in which condition it has already been saturated by the "block" pulse and, consequently, cannot support further flux change. Since a flux change requires a continuous path, there is therefore no flow around path 34 and as a result no hysteresis activity whereby a signal can be induced in the output winding 38. Similarly, a pulse of opposite polarity, calculated to reverse the flux in a counterclockwise direction, could produce a flux reversal in path a, but finds path b already saturated in the direction of arrow 40 by the "block" pulse and consequently is ineffectual to produce the required flux change completely around the path which is necessary for the transformer action which produces signal interchange from input to output winding.

Figure 5:
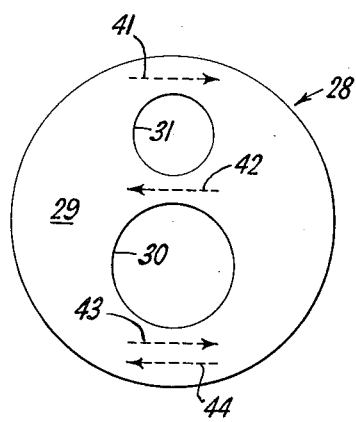
FIG. 5 is a similar representation of a transfluxor in the "set" state.

When, however, a signal pulse is transmitted through "set" winding 36, with the proper polarity to effect a counterclockwise reversal of flux, and of sufficient amplitude to accomplish this reversal in the area of path 33, the condition demonstrated in FIG. 5 results. Arrows 41 44 still show clockwise conditions of flux caused by the blocking pulse. Arrows 42 and 43, however, indicate counterclockwise flux conditions created by the set pulse. Now, a current pulse through input winding 37 linked through aperture 31, and having the proper polarity to create a counterclockwise reversal of flux in path 34 around it, will reverse the flux conditions indicated by arrows 41 and 42 and thereby induce a signal in the output winding 38.

Again, a current pulse of opposite polarity transmitted through input winding 37 accomplishes a clockwise reversal of flux to reset the core and induce another signal in the output winding 38. Thus, an A.C. input to winding 37 will induce positive and negative going signals in output winding 38. If input signals of one polarity only are available for winding 37, flux path 34 around aperture 31 can be reset after each signal pulse by applying to the prime winding 39 a current pulse of polarity opposite that of the signal input pulse.

FIGS. 6–9 show an interconnection of windings of transfluxors 28 to form a switching matrix 27 adapted to shift connection (between inputs 13b–25b and outputs A–M) one step to the right (as shown in FIG. 1) for each successive operating cycle. For purposes of simplifications, the 13 x 13 matrix indicated in FIG. 1 has been reduced to a 3 x 3 matrix in FIGS. 6–9.

Figure 6:
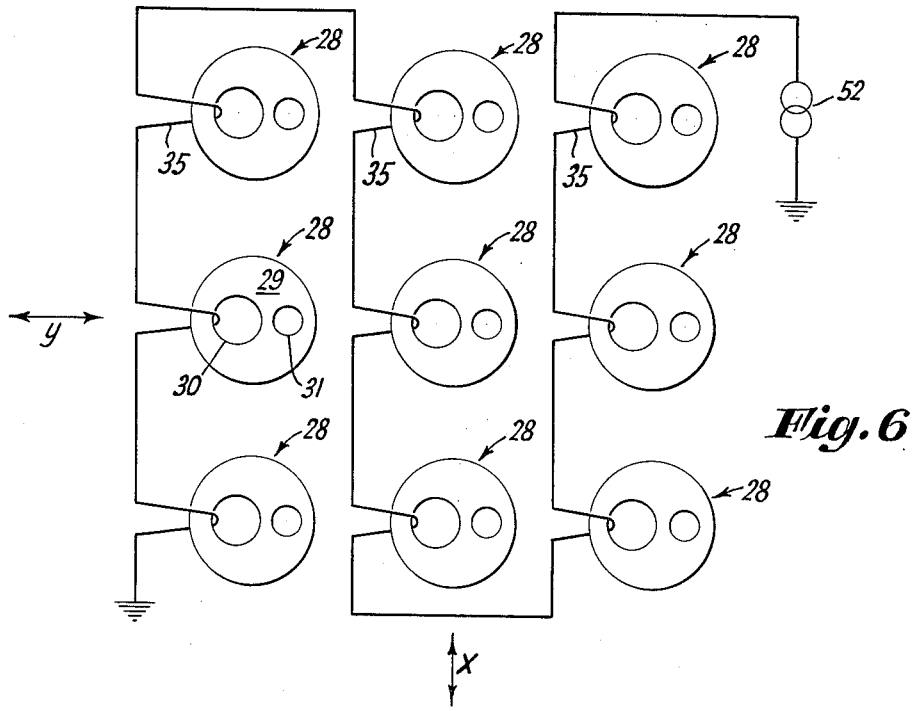
FIG. 6 is a diagrammatic representation of the interconnection of the "block" windings in the embodiment of the invention described.

Referring to FIG. 6, the transfluxors 28 are coupled in a 3 x 3 matrix of vertical (x) and horizontal (y) coordinates. "Block" windings 35 are shown linked serially through the aperture 30 of each transfluxor 28, and connected to a common blocking pulse source 52. This pulse may be derived from, or controlled by, a clocking signal on track 51 of drum 26 (see FIG. 1). Thus, a pulse from source 52 "blocks" all of the transfluxors 28 in the matrix and prevents, by means of the blocking action described above, signal transfer between the input and output circuits.

Figure 7:
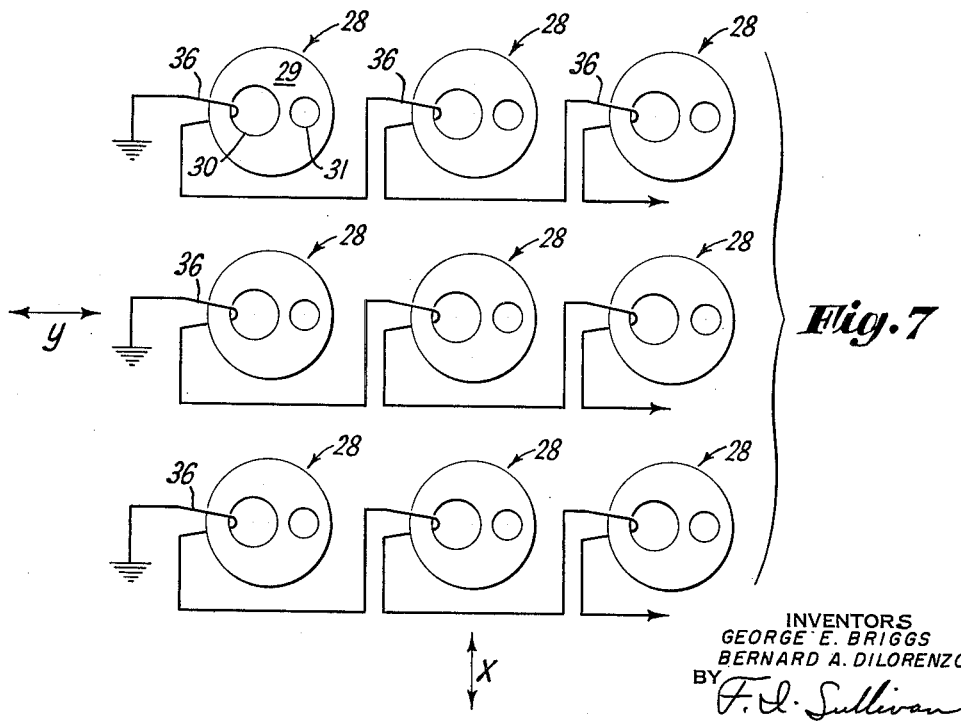
FIG. 7 is a similar diagram of the "set" windings.

FIG. 7 shows a series connection of "set" windings 36 for each horizontal y-coordinate row. Each row, or line, 45a, 45b, etc. is connected to the control unit 50 which pulses the lines individually in a controlled sequence to make the particular row of connections desired at any given time between inputs 13b–25b and outputs A–M. The individual "set" windings 36 are shown linking aperture 30, in the manner discussed above. They can also be employed with a leg linking each of the apertures 30 and 31.

Figure 8:
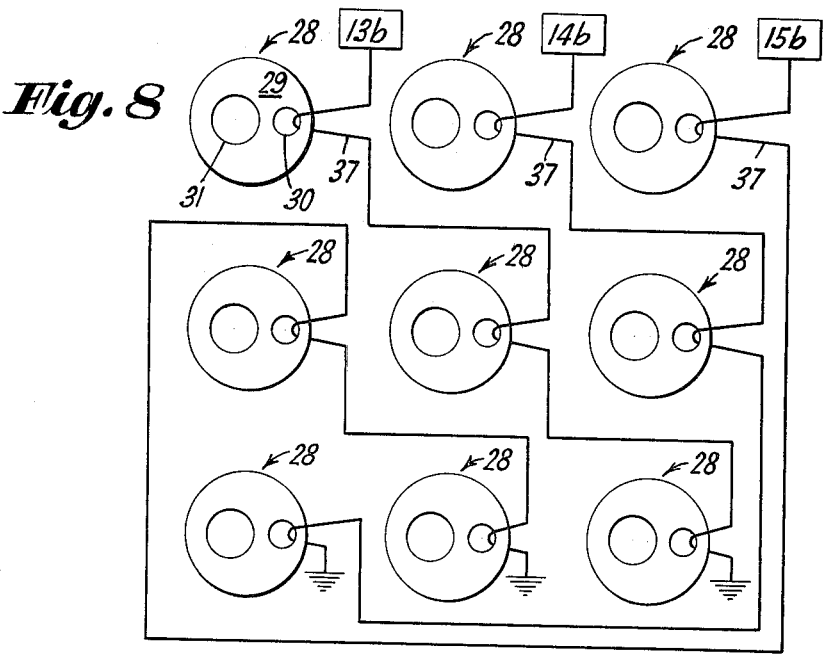
FIG. 8 is a similar diagram of the input windings.

FIG. 8 shows the interconnection of input windings 37 required to move the signal associated with each particular input one vertical row of transfluxors to the right for each successive horizontal row. It is to be noted, that a conductor 37 from input 13b is serially connected to the first transfluxor in the top horizontal row, the second transfluxor in the second row, and the third transfluxor in the third row. Thus, a signal transmitted through input 13b is linked to one transfluxor in each horizontal and each vertical row. Similarly, a conductor 37 from input 14b is connected to the second transfluxor in the top horizontal row, the third transfluxor in the second row, and then back to the first transfluxor in the bottom row; and input 15b is connected by a conductor 37 to the third transfluxor in the top row, back to the first transfluxor in the second row, and the second transfluxor in the bottom row.

Figure 9:
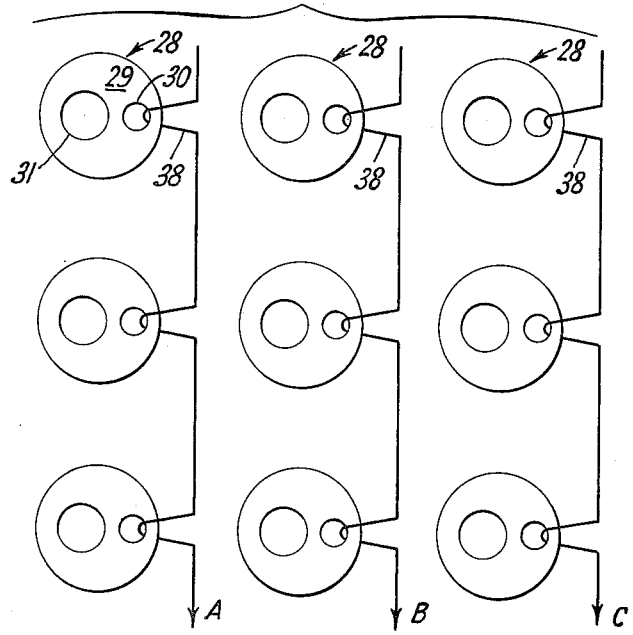
FIG. 9 is a similar diagram of the output windings.

FIG. 9 shows the output windings 38 serially connected within each vertical x-coordinate row, but with the rows themselves independent as far as these particular connections are concerned.

With the combination of windings described, when a separate "set" lines 45a–45m is pulsed by the control unit 50 the corresponding horizontal row is conditioned to couple the input and output windings of each of its component transfluxors; and, signals are transmitted from the switching matrix inputs 13b–25b to the outputs A–M in accordance with the particular combination of input windings 37 and output windings 38 in the apertures 31 of the transfluxors in the "set" row. When a different pattern of connection is desired, another horizontal row of transfluxors, having their individual input and output windings connected in the desired pattern, is pulsed.

The effect of such patterning of input and output connections is demonstrated in FIG. 1 where, with the output windings connected serially for each vertical row in the manner shown in FIG. 9 and the input windings staggered one transfluxor to the right in successive horizontal rows as shown in FIG. 8, the active connection or coupling, and consequently the output of the matrix, will follow the arrangement shown by the numerical identification of the blocks within the matrix 27. Thus, when horizontal line 45a receives a set pulse, input 13b will be connected to output A, input 14b will be coupled to output B, etc. When the next horizontal line 45b receives a set pulse, input 13b will shift one position to the right and be coupled to output B, etc. Thus, the input connections follow the diagonal path downward and to the right indicated by the arrow 49.

The set pulses from the control unit 50 are under control of a clocking pulse from track 51 of drum 26 through a delay device (not shown) so that they are effective after the block pulse has terminated. They may be produced by a conventional shift register if serial pulsing of the lines 45a–45m is desired, or from a magnetic tape or other suitable device capable of non-sequential operation if such is required.

The invention has been illustrated and described: as embodied in a system with a sequential input switched to parallel channels connected to a magnetic drum storage serving as a buffer to the switching matrix; also, with a particular interconnection of transfluxor inputs and outputs to accomplish serial shifting to the right in successive cycles. It is not, however limited to this specific disclosure. Parallel inputs, other forms or elimination of buffer storage, and other interconnections of windings linking the transfluxors are contemplated and will be apparent to those skilled in the art. In particular, it is to be understood that the switching matrix of the invention can be readily accommodated to different numbers of channels and other patterns of inter-connection to comply with the needs of other systems in which it finds useful application.

The scope of the invention is limited only by the following claims.

What is claimed is:

1. A data processing system which comprises a plurality of input channels, means connected to said input channels for applying signal pulses thereto, memory means associated with each channel for storing signals applied thereto, a plurality of output channels, and transfluxor switching means connecting said memory means to said output channels for interchanging signals as desired from each of said input channels to any one of said output channels.

2. An electronic data processing system which comprises: means for providing signal pulses to be processed; multi-output switching means connected to said source of signal pulses; multi-channel storage means connected to said switching means; and, a multi-input, multi-output transfluxor switching matrix connected to said storage means, said switching matrix including means for establishing a signal interchange relationship between each of said inputs and any one of said outputs in desired combinations.

3. A switching matrix plane comprising a plurality of "output" conductors arranged in $x$ coordinate rows, a plurality of "set" conductors arranged in $y$ coordinate rows intersecting said $x$ coordinates, a plurality of "input" conductors each intersecting the intersections of a plurality of said $x$ and $y$ coordinates, and transfluxor means at each of said intersections arranged for inducing a signal pulse in each of said output conductors when signal pulses coincide in any input conductor and associated set conductor intersecting at said means.

4. An electronic switching system having: a plurality of input terminals; a plurality of output terminals; and, means for connecting each of said inputs to any output in a controlled sequence, said means comprising a matrix arrangement of a plurality of transfluxors each having an input winding, an output winding, a "block" winding and a "set" winding; said transfluxors being arranged in a plurality of different groups, each of said groups being characterized by a common series connection of input windings but independent "set" and output windings; and, means connected to said "set" windings for applying signal pulses separately to said independent "set" windings of transfluxors having their input windings serially connected to provide for signal transfer from said series connected input windings to different output windings at different times.

5. An electronic data processing system comprising: a source of information in the form of electronic signals to be processed; a plurality of signal conductive channels; switching means arranged to connect said source for signal transmission to different ones of said channels in a desired pattern; a magnetic storage drum connected to said channels and having a separate storage track corresponding to each of said signal conductive channels; a switching matrix connected to said drum and having a plurality of inputs, one corresponding to each of said signal channel and storage track combinations, and a plurality of outputs; said matrix including a plurality of transfluxors having "block," "set," input and output windings and arranged in $x$ and $y$-coordinate rows, with each of said $x$-coordinate rows corresponding to one of said matrix outputs; means connected to said "block" windings for applying blocking pulses simultaneously to all of said transfluxors; means connected to said input windings for pulsing a plurality of individual transfluxors in separate $x$ and $y$-coordinate rows with signals from one of said storage tracks; means connected to said "set" windings for selectively applying "set" pulses to separate $y$-coordinate row of transfluxors; and, a plurality of series combinations of said output windings each connected to one of said matrix outputs for deriving a signal at said output in response to the application of a signal to the input winding of a transfluxor in the "set" condition in its associated $x$-coordintae row.

6. A switching matrix comprising: a plurality of ferromagnetic transfluxors having first and second apertures and arranged in $x$ and $y$-coordinate rows; serially connecetd "block" windings linking the first apertures of all of said transfluxors; a "set" winding also linking said first aperture of each transfluxor, said "set" windings being independently connected for, and serially connected within each $y$-coordinate row; a plurality of input terminals; an "input" winding linking the second aperture of each transfluxor, said "input" windings being divided into separate groups each characterized by serial connection to one of said input terminals; at least some of of the input windings of each group linking apertures of transfluxors in different $x$ and different $y$-coordinate rows; a plurality of output terminals; an "output" winding linking said second aperture of each transfluxor, said "output" windings being independently connected for, and serially connected within, each $x$-coordinate row; each of said rows of "output" windings being connected to an output terminal; means connected to said "block" windings for applying a pulse of electric energy to said series connected "block" windings; means connected to said input terminals for applying signals to said input terminals; and, means connected to said "set" windings for selectively applying pulses of electric energy to said $y$-coordinate rows of "set" windings so as to condition for signal transfer from input winding to output winding the transfluxors of a row having the particular combination of input and output connections desired.

7. For electronic data processing, a switching matrix which comprises: a plurality of first terminals; a plurality of second terminals; a plurality of groups of transfluxor signal transfer devices; each of said devices having a first and a second signal transfer winding; means connecting the first winding of each of said devices to one of said first terminals and the second winding of each of said devices to one of said second terminals, in different combinations for different ones of said groups; and, means connected to said devices for enabling said devices to transfer signals between their respective first and second elements, a single group at a time as desired.

8. For electronic data processing, a signal switching plane which comprises: a plurality of signal input channels; a plurality of signal output channels; a plurality of groups of magnetic core signal transformer devices each capable of being switched between signal transfer and non-signal transfer condition; an input and an output winding linking each of said devices; means connecting the input windings of separate ones of the devices in each of said groups to separate ones of said input channels; means connecting the output windings of corresponding devices in different ones of said groups to a common one of said output channels; and, means connected to said devices for selectively switching said devices, one group at a time, to signal transfer condition.

9. For an electronic data processing system a component plane which comprises: a plurality of input channels; a plurality of output channels; a plurality of transfluxors, each having input, output, block and set signal windings; means for connecting all of said block windings to a common block signal source, means for connecting said set windings, in independent groups, to a set signal source, thereby defining transfluxor groups;

means connecting each of said input channels separately to a separate input winding of each one of said transfluxor groups; and, means separately connecting each of said output channels to the output winding of one only of the transfluxors in each of said transfluxor groups.

10. A data processing system which comprises: a plurality of input channels, means connected to said input channels for applying signal pulses thereto, memory means associated with each channel for storing signals applied thereto, a plurality of output channels equal in number to said input channels, and transfluxor switching means connecting said memory means to said output channels and operative to interchange signals as desired from each of said input channels to any one of said output channels for selectively changing the order of said input signals and applying all of said signals in said changed order to said output terminals.

11. An electronic data processing system which comprises: means for providing signal pulses to be processed; multi-output switching means connected to said source of signal pulses; multi-channel storage means connected to said switching means; and, transfluxor switching means connected to said storage means having an equal plurality of inputs and outputs for selectively changing the order of signals on said inputs and transmitting all of said signals in said changed order to said output terminals, said switching matrix including means for establishing a signal interchange relationship between each of said inputs and any one of said outputs in desired combinations.

12. An electronic switching system comprising: a plurality of input terminals; a like plurality of output terminals; and, means for selectively changing the order of signals received on said input terminals and transferring all of said signals in said changed order to said output terminals and operative to connect each of said input signals to any one of said output terminals, said means comprising a matrix arrangement of a plurality of transfluxors each having an input winding, an output winding, a "block" winding, and a "set" winding, said transfluxors being arranged in a plurality of different groups, each of said groups being characterized by a common series connection of input windings but independent "set" and output windings; and, means connected to said "set" windings for applying signal pulses separately to said independent "set" windings of transfluxors having their input windings serially connected and operative to provide signal transfer from said series connected input windings to different output windings at different times.

13. For electronic data processing, a switching matrix for selectively changing the order of input signals which comprises: a plurality of input terminals; a like plurality of output terminals; a plurality of groups of transfluxor signal transfer devices, each of said devices having first and second signal transfer windings; a plurality of series combinations of said first signal transfer windings equal in number to said groups, each combination linking a different one of said input terminals and formed by linking successive transfluxors in said groups; a plurality of series combinations of said second signal transfer windings, each combination linking a different one of said output terminals and formed by linking corresponding transfluxors in said groups; and, means connected to said devices and operative to transfer signals from their respective inputs to their respective outputs, a single group at a time as desired.

References Cited by the Examiner

UNITED STATES PATENTS

| | | | |
|---|---|---|---|
| 2,713,199 | 7/55 | Adler | 340—166 |
| 2,821,696 | 1/58 | Shiewitz et al. | 340—149 |
| 2,901,731 | 8/59 | Snyder | 340—166 |
| 2,942,240 | 6/60 | Rajchman | 340—166 |
| 3,026,036 | 3/62 | Haanstra et al. | 235—157 |
| 3,076,181 | 1/63 | Newhouse et al. | 340—174 |

OTHER REFERENCES

Pages 321–332, March 1956, Proceedings of the IRE, vol. 44, No. 3.

MALCOLM A. MORRISON, *Primary Examiner.*

IRVING L. SRAGOW, *Examiner.*